United States Patent [19]

Labbé et al.

[11] 3,984,051

[45] Oct. 5, 1976

[54] SELF-DRAINING TANK

[75] Inventors: Jean G. Labbé, Chilly-Mazarin; André R. Hivert, Pontoise, both of France

[73] Assignee: Office National d'Etudes et de Recherches Aerospatiales (O.N.E.R.A.), Chatillon, France

[22] Filed: Feb. 18, 1975

[21] Appl. No.: 550,836

[30] Foreign Application Priority Data

Feb. 21, 1974 France .............................. 74.05944

[52] U.S. Cl. .................................. 239/44; 239/145
[51] Int. Cl.² ...................................... A24F 25/00
[58] Field of Search .................. 239/42, 43, 44, 47, 239/145; 60/202; 220/20, 22; 261/73, 99, 104, 107

[56] References Cited
UNITED STATES PATENTS

| 1,460,976 | 7/1923 | Nobbs | 261/99 |
| 3,379,855 | 4/1968 | Forrester et al. | 239/44 X |
| 3,577,734 | 5/1971 | King | 60/202 |

Primary Examiner—John J. Love
Attorney, Agent, or Firm—Hane, Baxley & Spiecens

[57] ABSTRACT

A tank for liquid drainable towards an outlet is disclosed which may be used in appliances where the action of gravity is neutralized such as in artificial satellites. The tank comprises a casing and inside said casing a porous retention material in contact with the inner surface of the casing and designed as a structure with compartments, the sections of the compartments decreasing in size in the direction towards the tank outlet and the dimensions of the pores decreasing in the said direction.

9 Claims, 4 Drawing Figures

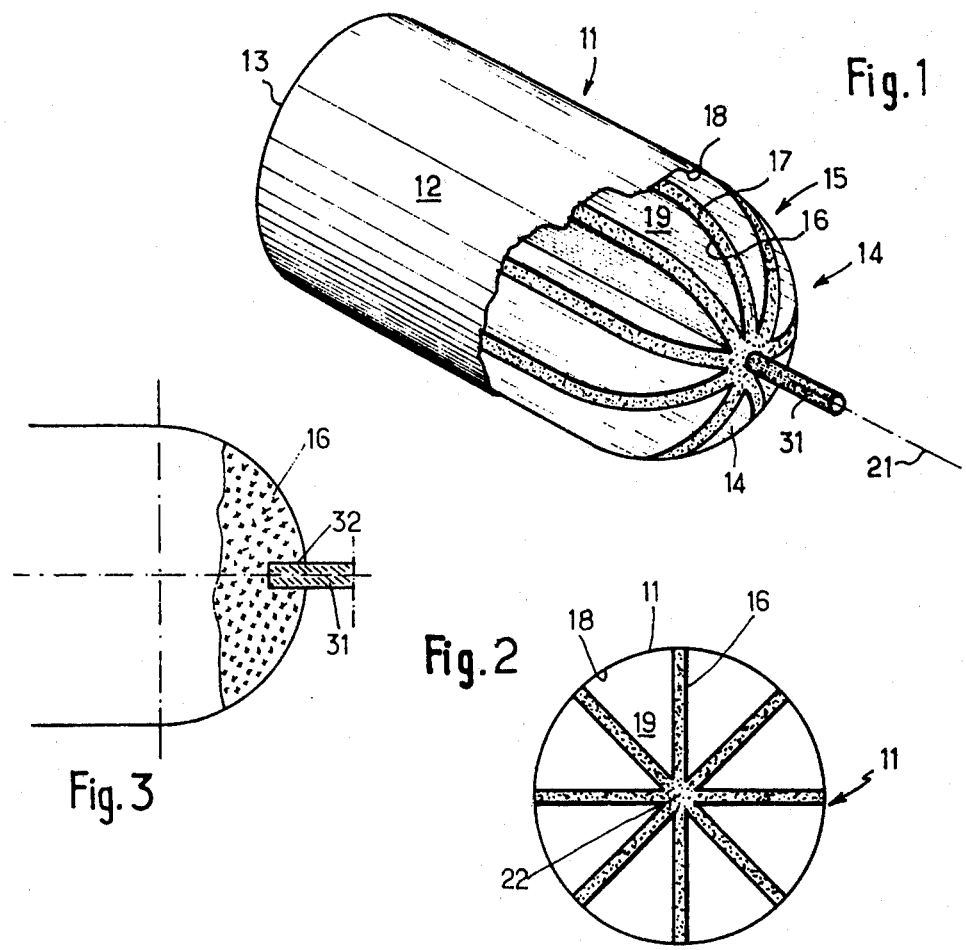
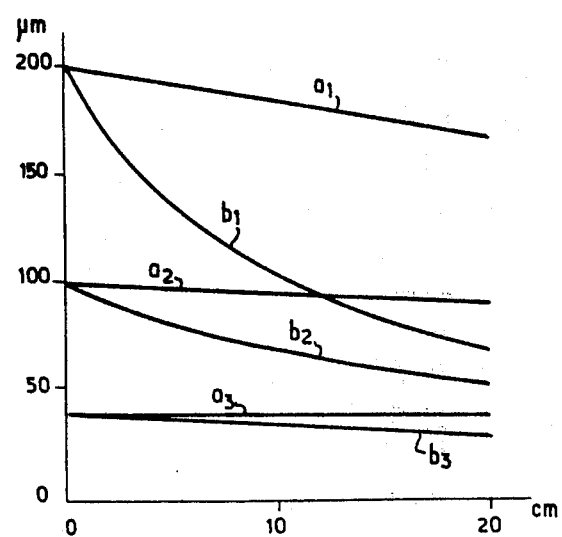

SELF-DRAINING TANK

The invention relates to a self-draining tank.

In order for it to be possible for a liquid contained in a tank to feed an appliance utilizing the liquid, it is necessary for the said liquid to be subjected to a field of force which ensures its transfer towards the zone of utilization. In ordinary applications this field of force is gravity.

For applications in appliance where the action of gravity is neutralized, such as in artificial satellites, it has been proposed to subject the liquid to the action of pressure forces via a diaphragm. But in the case of certain liquids, such as caesium, utilized in its capacity of an agent of ionic propulsion, their deleterious effect on the material of the diaphragm is an inhibiting obstacle to the use thereof.

It was then proposed to make use of the action of capillary forces. In a first type of embodiments there are provided in a cylindrical tank body compartments in the form of sectors converging towards the axis so that the decrease in section of the compartments in proportion as the axis is approached, tends to cause the liquid to progress from the peripheral parts toward the centre.

Production is onerous because of the delicacy of manipulation called for, particularly because the comparatively very numerous thin metal sheets bounding the compartments have to be connected to a wick disposed along the axis of the reservoir with one end projecting from the tank in order to ensure the feed of a device utilizing the liquid, such as for example an ionic vaporizer.

The capillary action is comparatively feeble. Unpriming may occur, which results in relatively large quantities of liquid remaining unused.

In a second type of embodiments the tank is filled with a porous body, the dimensions of the pores decreasing from the peripheral parts towards the axial zone, in which a long wick is inserted extending from end to end of the tank and projecting beyond it by one extremity. The weight of the tank thus filled with a porous body is considerably higher than that of embodiments of the first type. The porous body is usually a felt consisting of metal fibres, the metal being most often nickel or cobalt. The total area of the surfaces of contact between the liquid and the fibres is very large and as a result there is a high risk of contamination of the liquid, particularly by the oxygen which, in spite of the precautions adopted, is present at the surface of the fibres. Furthermore, the insertion of the long axial wick in the porous body causes interruptions in the structure and interferes with the movement of the liquid.

The tank according to the invention works better than known tanks and does not have the disadvantages of these.

According to the invention the porous material, particularly the felt of metal fibres, instead of merely constituting a filling for the tank casing, is so designed as to provide compartments whose sections decrease progressively towards the tank outlet.

In accordance with another feature of the invention the decrease in the mean size of the pores is provided, not only from the periphery towards the centre, but likewise in the direction of the tank axis oriented towards the tank outlet. The presence of an axial wick extending from one end of the tank to the other thus becomes superfluous, a wick in contact with the zone of the felt where the pores have the lowest dimensions being then sufficient.

The shape of the compartment system may be similar to that of the first type of embodiment mentioned above, that is to say the compartments are of sector form. The invention then provides that the compartment system shall be star-shaped, with the arms extending from an axail part or hub. The metal felt arms bounding the walls of the compartments have pores or interstices of decreasing dimensions starting from their external zones. The pores of the hub, of smaller dimensions than those of the radial walls or branches, are themselves of dimensions decreasing from the end opposite the outlet, to the outlet.

The invention provides a tank whose casing has a cross-section decreasing towards the outlet end, at least in the vicinity of this latter. The casing then advantageously includes a cylindrical portion followed by an hemispherical portion, at the pole of which the outlet orifice is located.

In a variant the cylindrical portion is followed by a frustoconical portion.

A tank according to the invention is particularly suitable for use in a caesium type ion propulsion unit. The capillary forces developed not only permit a regular feed of liquid of the propulsion unit in a state of zero gravity or negative gravity, but they likewise ensure a feed in the case where the tank is in a field of force such as that resulting from the rotation of the satellite carrying the ion propulsion system, or in the field of gravity, even if this latter is exerted in the opposite direction to that of the capillary forces, thus permitting the carrying out on the ground of preliminary tests before utilisation on an artificial satellite.

In the description which follows, given by way of example, reference is made to the attached drawing, in which:

FIG. 1 is a view in perspective, partly broken away;
FIG. 2 is a view in cross-section;
FIG. 3 is a side elevation with the front part of the casing partly broken away;
FIG. 4 gives graphs.

The tank comprises a casing 11 with a cylindrical body 12, and of which a bottom or base 13 may be plane, but of which the other end 14, connected to the utilizing system or outlet end, is of gradually decreasing cross-section, for example is hemispherical or frustoconical.

In order to simplify production the first end may also be of a similar shape to that of the outlet end.

Inside the casing 11 is disposed a compartment system 15. The compartment system is formed by fins or arms 16 whose edges 17 are in contact with the inner surface 18 of the casing 11, and are thus conjugate in profile with this latter. The fins 16 are radial and bound between them compartments 19 in the form of sectors whose cross-sections are increasingly smaller as the axis 21 is approached. The fins extend from a central hub 22 disposed along the axis.

The compartment system, that is to say the fins or arms and the hub, is advantageously manufactured from a metallic felt obtained as described in French Pat. No. 2 058 732 in the present Applicant's name.

The mean dimension or the pores of each fin 16 decreases continually from the external parts of the fins, that is to say those remotest from the axis, to the interior parts. Further, the mean size of the pores decreases from the parts situated at the rear, that is to say at the opposite end to the tank outlet end, to the parts situated at the front, both in each of the fins and along the hub 22.

The desired variations in dimensions of the pores are obtained by a forming of the porous material by means of greater or less pressure forces or the action of centrifugal force.

For machining, the felt is loaded with a curable material, such as methyl polymethacrylate, or a wax, such as ceresin. Machining does not have a glazing effect; on the contrary, it leaves the felt with a surface finish which is favourable for the exercise of capillary actions.

The surface of contact between the material with pores and the liquid with which the tank is filled, usually caesium, is very much smaller than in the case of a tank whose casing is filled with a fibrous mass. Thus pollution of the liquid is kept to a minimum.

The tank does not have a wick extending from one end to the other. All that is provided is a short terminal wick 31 and, for its junction to the tank, a bore 32 is drilled at the front end of the hub 22; the wick 31 is then forced into the said bore.

When applied to an ion propulsion system, caesium arriving in the regular manner at the said wick is vaporised and arrives at the ion propulsion system proper comprising a tungsten wall heated to a high temperature and electrodes which ensure the acceleration of the ionised caesium atoms coming from the wall, the electrical neutralisation of the atoms set in motion being effected in known manner.

The graph in FIG. 4 illustrates a law of variation in the mean diameter of the pores along the length of the tank ensuring a satisfactory feed to the wick. In this graph the distances from the rear end of the tank are plotted on the abscissae and the pore diameters as ordinates.

The curve $a1$ is that of the law of variation of the pore diameters starting from a maximum diameter of 200 $\mu$ of a compartment system ensuring satisfactory operation even for a field of forces equal to 0.1 g, g being the acceleration due to gravity. The curve $b1$ is characteristic of a compartment system ensuring satisfactory operation even under the field of force of gravity.

The curves $a2$ and $b2$ are similar to the curves $a1$ and $b1$ but relate to pore diameters where the maximum is 100$\mu$.

The curves $a3$ and $b3$ are similar curves, but with a maximum pore diameter of 40$\mu$.

In one form of embodiment it is provided for the inner surface 18 of the casing to be covered with a sheet of fibrous material, in contact with the compartment system.

In this way the quantity of "undrainable" liquid is even further reduced.

We claim:

1. A tank for liquid drainable towards an outlet comprising, a casing, a porous retention material in contact with the inner surface of the casing and designed as a structure with compartments, the sections of the compartments decreasing in size in the direction of liquid flow towards the tank outlet and the dimensions of the pores also decreasing in the direction of the liquid flow towards the tank outlet.

2. A tank as claimed in claim 1, in which the casing is of generally cylindrical form and the compartments are star-shaped.

3. A tank as claimed in claim 2, in which the casing has a cylindrical body and an end portion whose cross-section decreases in proportion as the outlet is approached.

4. A tank as claimed in claim 3, in which the end portion is hemispherical.

5. A tank as claimed in claim 1, in which the porous material constitutes a single element forming radial walls in the form of the arms of a star and a central hub.

6. A tank as claimed in claim 1, in which the porous material is a felt of tubular metallic fibres.

7. A tank as claimed in claim 6, in which the metal of the felt is selected from among the group consisting of nickel and cobalt.

8. A tank as claimed in claim 1, in which a part of the inner surface of the casing is covered by a sheet of a porous material in contact with the porous material of the compartments.

9. A tank as claimed in claim 5, comprising a wick sunk in a bore drilled in the end of the hub.

* * * * *